US008473917B2

(12) United States Patent
Weatherhead et al.

(10) Patent No.: US 8,473,917 B2
(45) Date of Patent: Jun. 25, 2013

(54) ENHANCED OPERATION DIAGNOSTICS

(75) Inventors: Norman A. Weatherhead, Ayr (CA);
Mark K. Matheson, Cambridge (CA);
Hui Xu, Brampton (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 326 days.

(21) Appl. No.: 12/895,011

(22) Filed: Sep. 30, 2010

(65) Prior Publication Data

US 2012/0083906 A1 Apr. 5, 2012

(51) Int. Cl.
*G06F 9/44* (2006.01)
*G06F 11/00* (2006.01)
*G05B 11/01* (2006.01)
*G05B 19/18* (2006.01)
*G05B 15/00* (2006.01)

(52) U.S. Cl.
USPC ............... 717/125; 717/124; 700/17; 700/20; 700/26; 700/65; 700/83; 714/37

(58) Field of Classification Search
USPC .................. 717/124–135; 700/17, 20, 26, 65, 700/83; 714/37, 38.1
See application file for complete search history.

(56) References Cited

U.S. PATENT DOCUMENTS

| | | | | |
|---|---|---|---|---|
| 5,574,652 A * | 11/1996 | Murphy | | 700/180 |
| 6,268,853 B1 * | 7/2001 | Hoskins et al. | | 700/83 |
| 6,556,950 B1 * | 4/2003 | Schwenke et al. | | 702/183 |
| 6,675,350 B1 * | 1/2004 | Abrams et al. | | 715/229 |
| 6,862,553 B2 * | 3/2005 | Schwenke et al. | | 702/183 |
| 7,139,618 B2 * | 11/2006 | Danz et al. | | 700/23 |
| 7,266,764 B1 * | 9/2007 | Flam | | 715/209 |
| 7,693,581 B2 * | 4/2010 | Callaghan et al. | | 700/9 |
| 2003/0182083 A1 * | 9/2003 | Schwenke et al. | | 702/183 |
| 2005/0166203 A1 * | 7/2005 | Danz et al. | | 718/100 |
| 2007/0073521 A1 * | 3/2007 | Carle et al. | | 702/188 |
| 2007/0293952 A1 * | 12/2007 | Callaghan et al. | | 700/9 |

* cited by examiner

*Primary Examiner* — Wei Zhen
*Assistant Examiner* — Qing Chen
(74) *Attorney, Agent, or Firm* — Turocy & Watson, LLP; William R. Walbrun; John M. Miller

(57) ABSTRACT

Systems and methods are provided that dynamically render permissive status information on a human-machine interface (HMI) to inform an operator of conditions that are preventing an issued control command from executing. A status display generator deployed on the HMI can be associated with a control action to be initiated in a control program via the HMI. The control action can have one or more programmed conditions or permissives that must be satisfied before the control action can be initiated. Operators wishing to review the states of the various conditions can invoke the status display generator, which reads the conditions and their respective statuses from the control program and generates a permissive summary display listing the conditions together with their respective "ready" or "not ready" states. The permissive summary display provides a convenient reference that allows the operator to quickly assess what actions must be taken to place the system in the appropriate state to execute the desired control action.

19 Claims, 14 Drawing Sheets

ENHANCED OPERATION DIAGNOSTICS

TECHNICAL FIELD

The claimed subject matter relates generally to industrial control diagnostics, and more particularly to visualization of permissive information to assist operators with diagnosing a disabled control operation.

BACKGROUND

Programmable automation controllers (PACs) and their associated control programming are at the heart of modern industrial automation systems. These controllers interact with field devices on the plant floor to carry out controlled processes relating to such objectives as manufacture of a product, movement of material through a system, and other such processes. The controllers typically exchange data with the field devices using native hardwired I/O or via a plant network such as Ethernet, Data Highway Plus, Devicenet, or the like. The controller receives any combination of digital or analog signals from the field devices indicating a current state of the devices (e.g., temperature, position, part presence or absence, fluid level, etc.), and executes a control program that performs automated decision-making for the process based on the received signals. The controller then outputs appropriate digital and/or analog control signaling to the field devices in accordance with the decisions made by the control program. These outputs can include component actuation signals, temperature or position control signals, commands to a machining or material handling robot, and the like. The control program executed by the controller can comprise any conceivable type of code used to process input signals read into the controller and to control output signals from the controller, including but not limited to ladder logic, sequential function charts, function block diagrams, structured text, or other such platforms.

To facilitate operator interaction with the PACs (and with the processes controlled thereby), industrial control systems often include at least one human-machine interface (HMI) that communicates with the PAC and visualizes data therein one or more display screens. The HMI screens also allow an operator to issue commands (e.g., machine start commands) or write values (e.g., setpoint values) to the PAC to control or alter the process being automated by the PAC. Often, commands issued through the HMI to trigger an action in the PAC (e.g., to start a machine cycle or to actuate a field component) are subject to one or more conditions that must be satisfied before the desired action can be performed. For example, a command to start a machine's auto cycle may require that certain part positioning or tooling devices are in a home position and a mode switch to be set to an "AUTO" position before the cycle is allowed to begin. In such an instance, the control program will typically include these criteria as conditions that must be met before the controller output that initiates the auto cycle will be energized. Sensors on the field devices report the respective positions thereof to the PAC as inputs, and the controller program either allows or prevents the desired action based on the values of these inputs. Similarly, a command issued through the HMI to actuate a field component may be prevented by the control program if another movable field component is in an extended position that would physically interfere with the desired actuation. Again, the control program executing in the PAC reads the values of position sensors associated with the potentially interfering devices and prevents the controller output associated with the desired actuation from energizing if the sensor values indicate a potential interference.

In module-based control programs, external system conditions such as those listed above can be programmatically associated with a given module as one or more permissives or interlocks, such that the ability to issue a command to the given module depends on all associated permissives and interlocks being in a correct state. In addition to conditions external to the PAC, a module's readiness to receive and respond to an operator-issued command can further be a function of one or more internal program statuses. For instance, the ability to issue a command to a given module (e.g., a module associated with a valve) can be permitted or denied based on such internal conditions as the current mode of the module, the module's present state, or the module's configured capabilities.

Modern industrial automation systems often comprise many such complex interdependencies between physical components, system states, operating modes, manual control devices, and the like. System engineers set out to design control programs that take these many system dependencies into consideration in an effort to ensure proper coordination of various processes that make up an automation system, as well as to guarantee safety of personnel. However, from the point of view of a system operator, who typically is not involved in the system design process and therefore is not necessarily conversant with the low-level system interactions, these complex system dependencies often make it difficult to ascertain why a desired command issued by an HMI is being prevented from executing.

HMIs are often designed such that screen elements (e.g. soft buttons, data entry fields, etc.) designed to allow manual commands to be issued to the PAC are disabled on the HMI screen if one or more permissives associated with the desired action are not met. These screen elements are sometimes visually altered (e.g., "greyed out" or rendered invisible) to convey to the operator that one or more prerequisites are not met. However, it is left to the operator to determine which conditions are preventing the desired command from being issued. Diagnosis of such command failures relies upon the particular operator's knowledge of the automation system, which is often a function of experience. If the operator is unable to locate the missing conditions preventing a command from being carried out, it may even be necessary for maintenance personnel or a plant engineer to go online with the PAC to track the missing permissives in the control program before an operator can set about correcting the missing conditions. Although custom display screens can be developed for the HMI that list the conditions for a given action together with their respective states, such screens must be created and programmed by a system developer and manually linked to the program addresses associated with the respective conditions, increasing development time and adding complexity to the HMI application. Moreover, if an engineer or maintenance personnel subsequently modify the control program to add or remove a condition for a control action, such custom screens must then be modified accordingly by the HMI developer to reflect the changes.

Given the difficulties diagnosing such command failures, there is a need for an operation diagnostic tool that can be easily deployed to visualize diagnostic permissive information for HMI-issued commands.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to an enhanced operation diagnostics system that can provide an operator with a summary of operational conditions associated with a particular control action, together with the present statuses of the respective conditions. This summary can, for example, take the form of a checklist itemizing the necessary conditions associated with a given control action or module. The summary can be invoked by an operator through an appropriate interaction with the HMI display (e.g., by touching or clicking on a symbol on an HMI faceplate used to issue the command for the desired action). The summary provides an easily understood reference that can be used by an operator to determine which system conditions, both internal and external to the controller, are preventing a desired action from being carried out so that the operator can correct the missing conditions. The summary can also serve as a visual confirmation that all necessary system conditions are satisfied prior to issuing the command for the desired control action.

To simplify generation of status summaries, a status display generator is provided that can operate natively within the HMI software to generate and populate the summaries without the need to write extensive custom code in either the HMI or the control program. When an operator invokes a summary for a given command or module, the status display generator can poll the controller and determine both the identities and statuses of the set of conditions (e.g., permissives, interlocks, alarm conditions, etc) associated with the command. Using this information, the status display generator can create a summary display listing the conditions that must be satisfied before the command can be executed, as well as the present statuses of the respective conditions. This status display generator can thus generate condition summaries without the need for an HMI designer to create new custom display screens.

In one or more embodiments, the status display generator can analyze the control program directly to acquire the necessary condition information for a given command. For module-based control programs, this can entail analyzing the module associated with the device or operation to which the desired command is directed, ascertaining the various permissives, interlocks, module statuses, alarms, etc. associated with the module, and acquiring the statuses associated therewith. These conditions and their respective statuses can then be rendered in an organized fashion on the HMI via one or more diagnostic summary displays that can be invoked from an HMI display or faceplate associated with the module. The condition summaries can be organized according to category, allowing a user to navigate the condition statuses according their respective categories (e.g., alarms, interlocks, permissives, module mode, etc.).

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
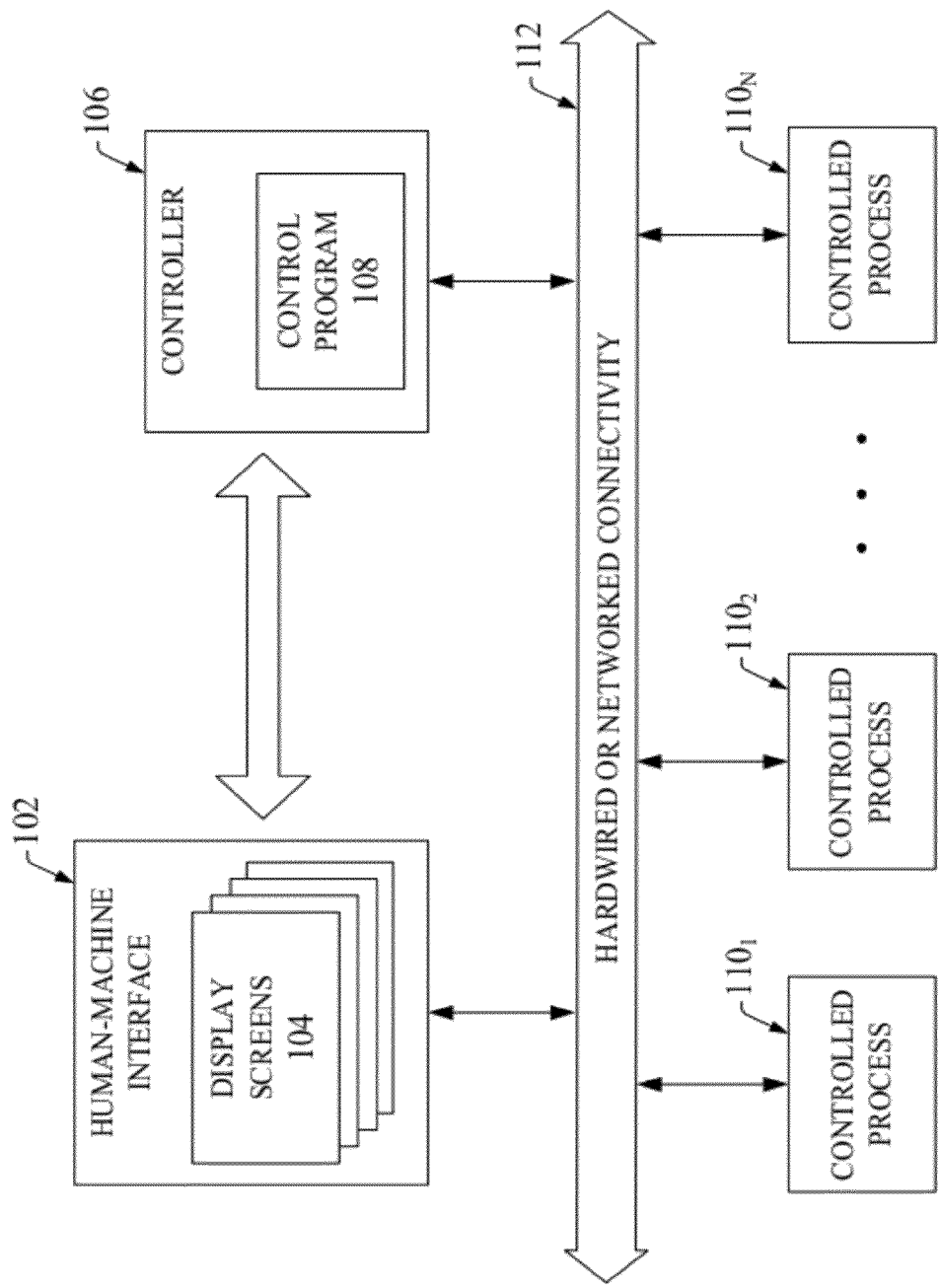
FIG. 1 depicts an exemplary control environment in which the enhanced operation diagnostics of the present invention can be used.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

FIG. 1 illustrates an exemplary control environment in which the enhanced operation diagnostics of the present invention can be used. An industrial facility can comprise one or more controlled processes $110_1$-$110_N$ designed to manufacture a product, perform material handling, or perform other such industrial functions. Controlled processes $110_1$-$110_N$ can be monitored and controlled by at least one controller 106. Controller 106 can comprise an industrial controller, such as a programmable automation controller (PAC), that executes a control program 108 to facilitate monitoring and control of controlled processes $110_1$-$110_N$. Control program 108 can comprise any conceivable type of code used to process input signals read into the controller and to control output signals from the controller, including but not limited to ladder logic, sequential function charts, function block diagrams, or structured text. Data read into or generated by controller 106 can be stored in memory addresses within controller memory, which can comprise native memory or removable storage media.

Controller 106 can communicatively interface with controlled processes $110_1$-$110_N$ over hardwired or networked connections 112. For example, controller 106 can be equipped with native hardwired inputs and outputs that communicate with one or more field devices associated with the controlled processes $110_1$-$110_N$ to effect control of the devices. The native controller I/O can include digital I/O that transmits and receives discrete voltage signals to and from the field devices, or analog I/O that transmits and receives analog voltage or current signals to and from the devices. The controller I/O can communicate with the controller's processor over a backplane such that the digital and analog signals can be read into and controlled by the control programs. Controller 106 can also communicate with field devices over a network using, for example, a communication module or an integrated networking port. Exemplary networks can include the Internet, Intranets, Ethernet, DeviceNet, ControlNet, Data Highway and Data Highway Plus (DH/DH+), Remote I/O, Fieldbus, Modbus, Profibus, wireless networks, serial protocols, and the like. It is to be appreciated that controller 106 is not limited to the above specifications, and can include virtually any type of controller used to control an automated process.

The system can also include at least one human-machine interface (HMI) 102 communicatively coupled with controller 106 (e.g., via network 112). HMI 102 can exchange data with controller 106 to facilitate visualization of information relating to controlled processes $110_1$-$110_N$ and to allow an operator to submit data to controller 106 in the form of issued commands (e.g., cycle start commands, device actuation commands, etc.), setpoint values, and the like. HMI 102 can include one or more display screens 104 through which the operator interacts with the controller 106, and thereby with the controlled processes $110_1$-$110_N$. Exemplary display screens can visualize a present state of the controlled processes $110_1$-$110_N$ using animated representations of the processes that display metered or calculated values, employ color or position animations based on state, render alarm information, or employ other such techniques for presenting relevant data to the operator. Data presented in this manner is read from controller 106 by HMI 102 and presented on one or more of the display screens 104 in a format chosen by the HMI developer.

Display screens 104 can also include one or more display elements that allow an operator to submit data to the controller 106 to facilitate control of processes $110_1$-$110_N$. These input elements can include virtual pushbuttons or switches, data entry fields, or other such elements designed to receive input from an operator. Often, commands issued by the operator via HMI 102 to perform an action (e.g., start a machine process, advance or retract a cylinder, enter a new process setpoint value, initiate a homing sequence for a machine or robot, etc.) are subject to one or more conditions or criteria that must be satisfied before the desired action can be carried out by the controller 106. These conditions are typically encoded by the system developer into control program 108, which blocks the desired action if one or more permissives are not met.

Figure 2:
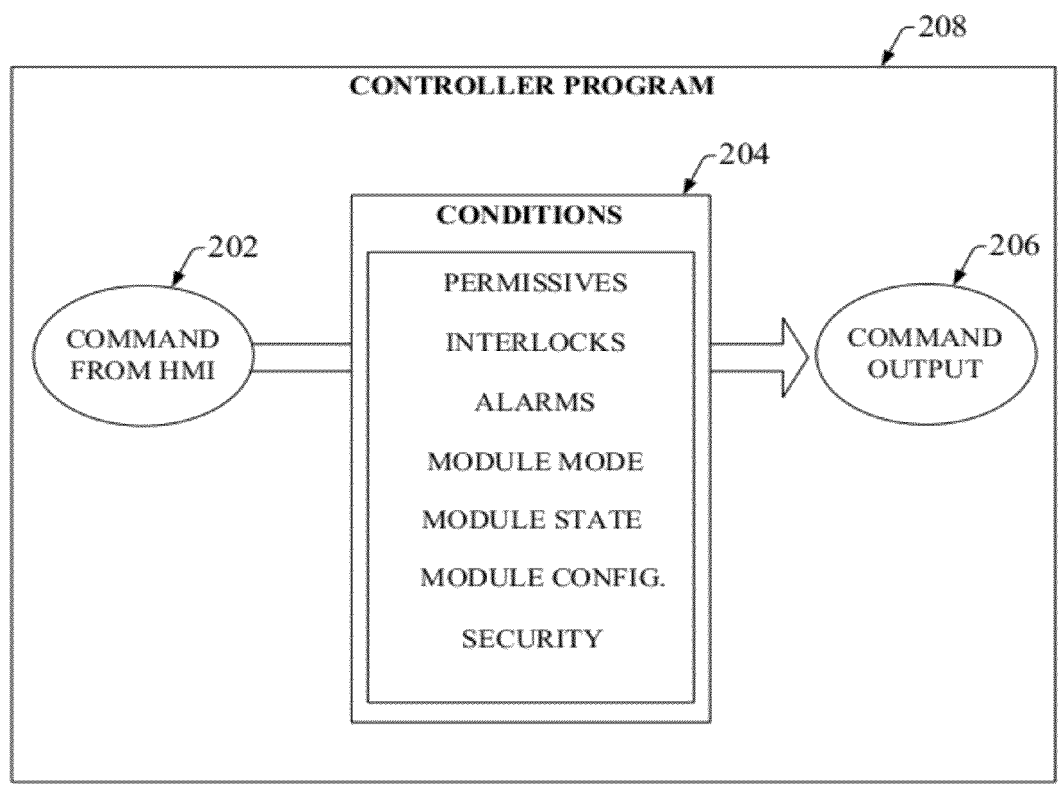
FIG. 2 depicts a general relationship between an issued HMI command and the conditions that allow or prevent the command from being executed.

FIG. 2 illustrates a general relationship between an issued HMI command and the conditions that allow or prevent the command from being executed. A control program 208 can include at least one command output 206 that can be triggered by a command 202 from an HMI. Command 202 can be issued from the HMI, for example, via a display object that is linked to the particular module or portion of the control program that performs the requested action. Command output 206 can have one or more conditions 204 that allow or prevent the requested action from taking place. These conditions can include, but are not limited to, such criteria as permissives, interlocks, alarms, a mode or state of the module that performs the action, the module's configuration, security-related conditions, or other such conditions. These various exemplary conditions are described below.

Permissives can include conditions relating to the controlled process that must be met before the desired command can be executed. Example permissives can include a verification that a measured oil or air pressure is within a correct operating range, a verification that a measured temperature is within an acceptable range, a position sensor status, a mode switch position, or other such permissives. An interlock can represent a state of a machine or process that is not compatible with the desired action, and thus prevent the action from taking place if the incompatible state is active. For example, it may be undesirable to activate a first conveyor if a downstream conveyor is not also running. The portion of the control program that controls the first conveyor may therefore contain an interlock from the downstream conveyor that ensures the downstream conveyor is running before the first conveyor is allowed to run.

Alarms can include in particular those alarms that are relevant to the desired action, and which must be corrected and/or cleared before the desired action can take place. A module mode can represent the current operating mode of the module that performs the command. For example, if the module is in a program mode or other non-running mode, any commands issued to the module will not be carried out. The module's state can reflect a current state of a device controlled by the module, which can play a factor in deciding whether an issued command is able to be performed by the module. For instance, a VALVE OPEN command issued to a module that controls a valve will not be carried out if the valve is already in the opened state.

The module's configuration can also determine whether a command issued to the module is able to be performed. For example, if a module that controls operation of a motor has not been configured to allow jogging capability, the module will not carry out received commands to jog the motor under its control. Security can include operational privileges that have been granted or denied to particular users or user roles, such that a command to perform a given action will only be allowed to execute if issued by a user with appropriate security privileges.

It is to be appreciated that the condition types described above are only intended to be exemplary, and that any suitable category of criteria for executing a command is considered herein. These conditions are typically configured within the portion of the control program associated with the particular action. In a module-based control program, this can comprise associating the conditions with the module that performs the action, either by encoding the conditions within the module or by linking the conditions to one or more module inputs that are preconfigured to either allow or deny the control action depending on the state of the input.

As noted above, an operator attempting to issue a command such as that depicted in FIG. 2 must often rely on his or her own knowledge of the system to determine which conditions are preventing the command from executing on the controller. Depending on the HMI design, a display element used to issue a given command may be disabled (e.g., "greyed out" or rendered invisible) if one or more necessary conditions associated with the command are not satisfied, or alternatively may simply not respond to the operator's input. It is left to the operator to determine which conditions are preventing the command from being carried out. However, inexperienced operators may not have sufficient experience with the system to know which conditions must be corrected before the desired action can be implemented.

Figure 3:
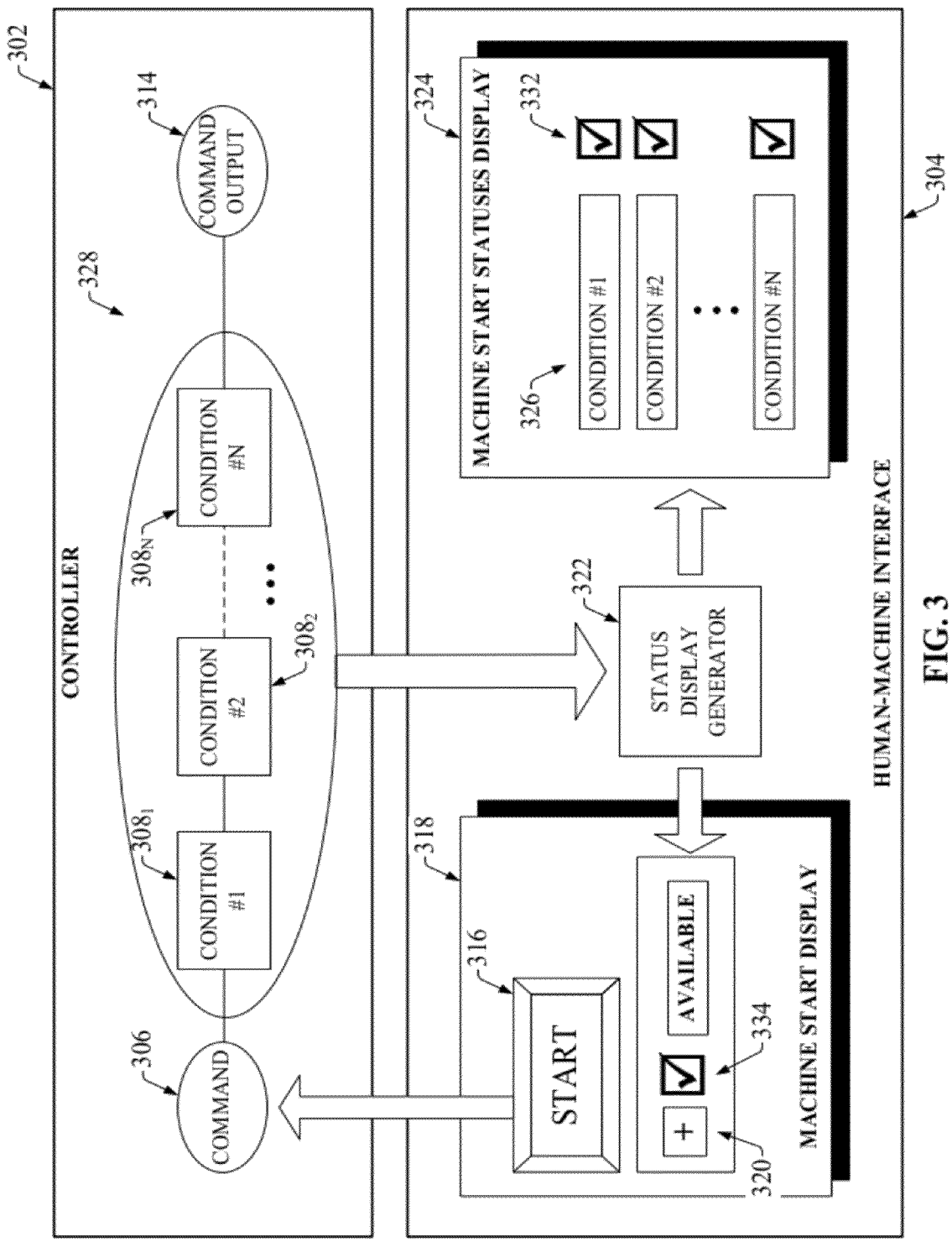
FIG. 3 depicts an exemplary system that employs one or more embodiments of the subject enhanced diagnostics.

In order to provide diagnostic assistance to the operator without the need for an HMI developer to create and program custom display screens, one or more embodiments of the present disclosure can include a status display generator that executes as part of the HMI application and that generates summaries of a given action's list of necessary conditions as well as their respective states. FIG. 3 illustrates an exemplary system that employs one or more embodiments of the subject enhanced diagnostics. Controller 302 executes a control program that includes a portion of code 328 that controls energization of particular command output 314. Code portion 328 is depicted abstractly in FIG. 3 as a command trigger 306, a series of conditions $308_1$-$308_N$, and a command output 314, and can represent code developed in any suitable control programming format, including but not limited to module-based programming, ladder logic, sequential function charts, function block diagrams, or other such platforms. Command output 314 can represent substantially any operation that can be initiated from an HMI command and carried out by controller 302 in response thereto, such as a machine cycle start, a device actuation, a mode change, a setpoint value change, or other such actions.

An HMI 304 is communicatively coupled to the controller 302 and includes at least one display screen 318 having a display element 316 (in this case, a START button object) that allows an operator to issue a command to perform the desired action. START button 316 is linked to command bit 306 using an appropriate addressing scheme such that command bit 306 is set in controller 302 when START button 316 is touched or clicked by an operator. However, before command output 314 can be energized in response to command 306, conditions $308_1$-$308_N$ must be satisfied. Since these conditions $308_1$-$308_N$ are hard-coded in controller 302, they are typically invisible to the operator.

HMI 304 also includes at least one status display generator 322. Status display generator 322 can be associated with the particular command 314, and can analyze the control program to identify the set of conditions $308_1$-$308_N$ associated with the command. For example, status display generator 322 can analyze the programming (e.g., module conditions, logic, sequential function charts, function block diagrams, structured text, etc.) associated with the output 314 to identify the conditions placed on energizing the output. For module-based control programs, status display generator 322 can be linked to the particular module that controls the desired control action associated with command output 314, and can thereby analyze the control module to determine all conditions (module state, module mode, associated interlocks and permissives, etc.) associated with the module that determine whether the action can be performed.

Once the conditions $308_1$-$308_N$ for the command output 314 are identified, status display generator 322 can read the statuses of the respective conditions $308_1$-$308_N$. Using this acquired data, status display generator can generate a suitable diagnostic summary display 324 that lists the conditions together with their respective statuses. Although summary display 324 is depicted in FIG. 3 in a checkbox format, it is to be appreciated that the summary display 324 can present condition information in any suitable display format that indicates whether each condition is in a correct state for execution of the desired command. The text for each permissive 326 rendered on the summary display 324 can be based on comment or label strings associated with the controller addresses/tags for the respective conditions, as read by the status display generator 322. In addition, status display generator 322 can display a composite availability indicator 334 on display screen 318 based on the statuses of conditions $308_1$-$308_N$. That is, if all conditions $308_1$-$308_N$ are satisfied, status display generator 322 can set icon 334 to a "ready" or "available" state (e.g., a check mark). If one or more of the conditions $308_1$-$308_N$ are not met, status display generator 322 can be set to a "not ready" or "unavailable" state (e.g., an "X"). If availability icon 334 indicates that the desired operation is not ready, the operator can invoke summary display 324 by selecting icon 320 to ascertain which conditions need to be corrected to place the operation in an available state.

As can be seen in FIG. 3, diagnostic summary display 324 is a customized condition summary for the command output 314 (in this exemplary scenario, a machine start command) that displays conditions $308_1$-$308_N$ as a list 326 together with checkboxes 332 indicating whether the respective conditions are in a state that allows the desired action to be carried out. This summary 324 provides the operator with an easily understood reference indicating which conditions need to be corrected before the issued machine start command will be allowed to execute by the controller 302. The checkbox indications can update their respective statuses substantially in real-time as the operator acts to correct the various missing conditions, providing a visual confirmation that all missing conditions have been corrected. The summary 324 can be invoked by the operator through any suitable interaction with the HMI 304, such as by triggering an icon 320 associated with the status display generator 322 and positioned next to the display item 316 used to issue the associated command. When invoked, summary 324 can be rendered as an overlaid or "pop-up" window over the currently displayed primary screen. Alternatively, selection of the permissive summary icon 320 can expand display screen 318 to display the condition status information within the same display. It is to be appreciated that the status display generator 322 can generate summary displays such as display 324 using native functionality without requiring an end-user application developer to design such status display screens as part of the HMI application.

Status display generator 322 can comprise a function block or object that can be deployed within the HMI application to facilitate display of condition diagnostic information as described above. For example, a status display generator 322 for a particular control operation can be embedded in a display screen (e.g., display screen 318) designed to allow an operator to issue a command to the controller 302 to initiate the operation. This status display generator 322 can then be linked to the portion of controller code 328 that controls the desired operation (e.g., to a control module that executes in the controller to control the operation) using any suitable addressing or tagging mechanism, thereby allowing status display generator 322 to analyze the code 328 and identify the various conditions associated with the desired operation. The embedded status display generator 322 can then control the appearance and behavior of overall status icon 334 and condition status display 324. Status display generator 322 can also render input icon 320 on display 318 to allow an operator to invoke status display 324 from display screen 318. Moreover, the embedded status display generator 322 can be linked to START button 316 and can act to disable this button if it determines that any of conditions $308_1$-$308_N$ have not been met, thereby preventing the operator from issuing the command.

It is to be appreciated that status display generator 322 can perform the analysis of control code 328 and display the appropriate conditions without the need to manually create a link to each individual condition associated with the desired action. Moreover, since the status display generator 322 can identify an operation's conditions $308_1$-$308_N$ by analyzing the control programming (e.g., module, ladder logic section, etc.) associated with the command output, conditions can subsequently be added or removed in the control program without the need to update the HMI application to reflect these new or deleted conditions in the summary 324.

As noted above, one or more embodiments of the status display generator described herein can interface with control programs comprising one or more control modules, which are modular portions of code having predefined interfaces and functionality. These modules can interface with other portions of the control program through predefined inputs and outputs and perform data processing in accordance with one or more functions coded into the module. A module can represent a common control process or piece of equipment (e.g., a sequencing module, a motor control module, a valve module, a material transfer module, a PID module, etc.), and can be deployed in any suitable controller to facilitate control processing per the module's designed functionality. Inputs, outputs, parameters, modes, statuses, and behaviors can be predefined for each module in accordance with its desired functionality.

Figure 4:
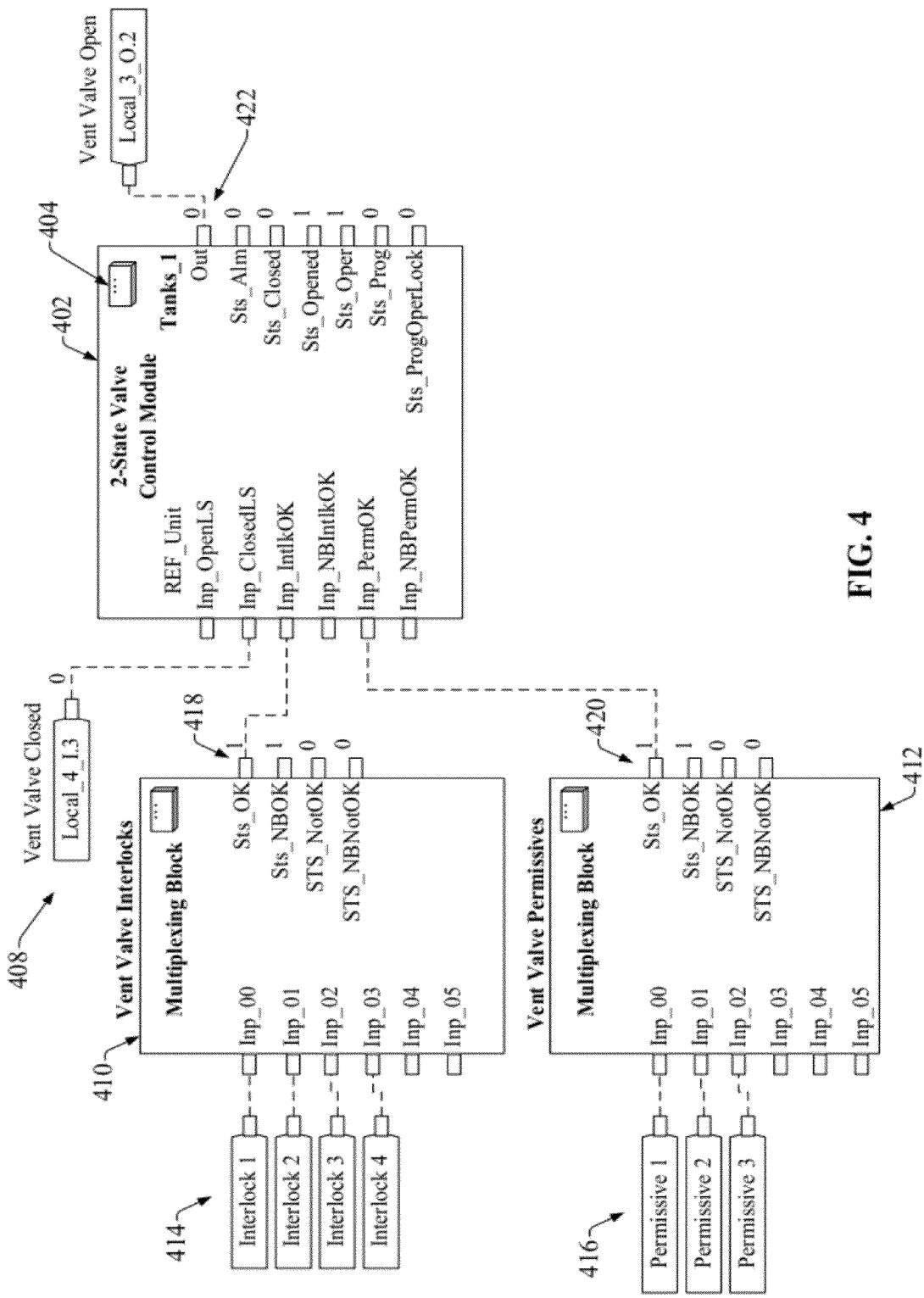
FIG. 4 depicts an exemplary configuration of control modules within a controller.

FIG. 4 illustrates an exemplary configuration of such control modules within a controller. This module configuration is presented in order to provide context for an exemplary application of the subject diagnostic display functionality to be described below. In the present example, valve control module 402 is deployed within a controller to facilitate control of a 2-state valve within an industrial process. Valve control module includes a number of inputs and outputs, including output 422 which is connected to physical controller output Local_3_O.2. This physical controller output in turn is connected to a solenoid in the field which, when energized, opens the 2-state valve. When valve control module 402 sets output 422, the corresponding physical controller output is energized, thereby opening the valve.

Valve control module 402 can be programmatically associated with a number of intrinsic and extrinsic conditions that dictate when setting of output 442 is allowed to occur. For instance, a limit switch input 408 indicating when the valve is in the closed position can be linked to an appropriate "Closed Limit Switch" input of valve module 402. If this status input 408 is turned on, valve module 402 will prevent the "valve open" output 422 from turning on, since it is assumed that the valve is already in the open position. In addition, interlocks 1-4 (414) and permissives 1-3 (416) can be linked to valve control module 402 via respective multiplexing blocks 410 and 412. Interlocks 414 and permissives 416 can represent additional conditions (e.g., machine running statuses, tank level float switch statuses, mode select switch positions, or the like) that must be in particular states before the valve can be opened. Multiplexing block 410 can receive interlocks 414 as inputs, and set a composite output bit 418 if all interlocks 414 are satisfied. This output bit 418 can be provide to an "interlock OK" input on valve control module 402 to convey to the module that all interlocks 414 are satisfied Likewise, multiplex block 412 can set an output 420 if all permissives 416 are in a correct state, and provide this output to a "permissives OK" input on valve control module 402. Valve control module 402 can examine these various condition inputs (limit switch state 408, interlock output 418, and permissive output 420), as well as any relevant alarms and program statuses, to determine whether output 422 is allowed to energize and thus open the valve.

Figure 5:
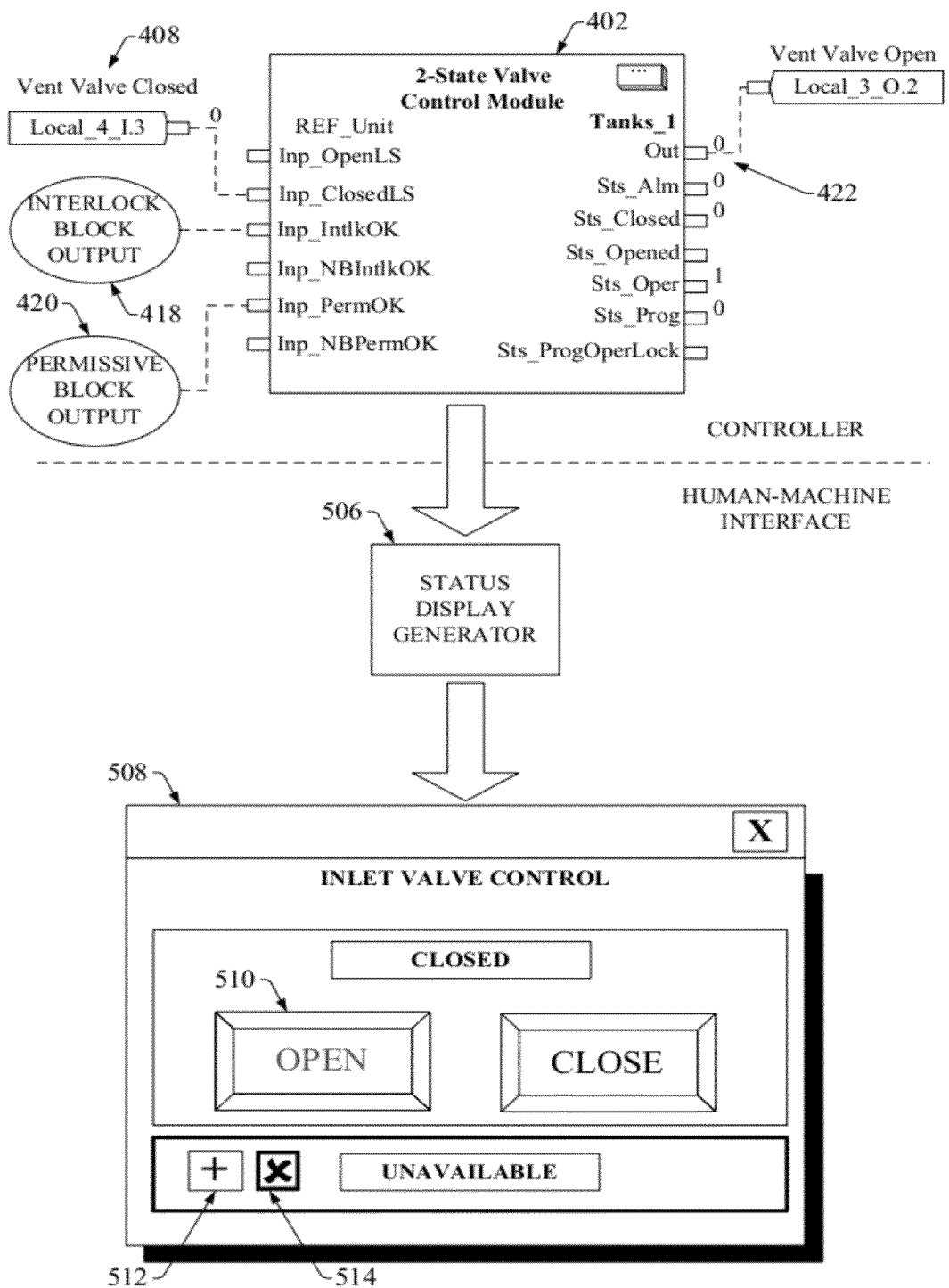
FIG. 5 illustrates generation of condition diagnostic information for an exemplary valve control module.

Generation of condition diagnostic information for the exemplary valve control module described above is illustrated in FIG. 5. Status display generator 506 can be embedded within or otherwise associated with a display screen or faceplate 508 that is part of a visualization application running on a human-machine interface that is communicatively coupled with the controller. In particular, display screen 508 can be a valve control screen configured to read data from and write data to valve control module 402 to facilitate manual actuation of the valve. To this end, display screen 508 can include an OPEN button 510 that, when touched or clicked by an operator, issues a command to valve control module 402 in the controller to turn on output 422 and thereby open the valve, subject to the programmed conditions described above in connection with FIG. 4 (e.g., valve closed status 408, interlock block output 418, and permissive block output 420).

Status display generator 506 can be linked to valve control module 402 using any appropriate referencing mechanism. This can include configuring status display generator 506 to reference a tag, address, or other programmatic identifier used to uniquely identify the valve control module 402. Once this association between status display generator 506 and valve control module 402 has been established, status display generator 506 can automatically be made aware of any conditions (e.g., permissives, interlocks, alarms, modes, etc.) associated with the valve control module 402 that must be satisfied before the module will allow valve control output 422 to be set. In the present example, at least one of the conditions described above in connection with FIG. 4 is not in a correct state to allow output 422 to be set. Accordingly, OPEN button 510 has been disabled. Disabling of OPEN button 510 can be in accordance with the configuration of display screen 508 itself, or alternatively can be controlled by status display generator 506 itself.

Figure 6:
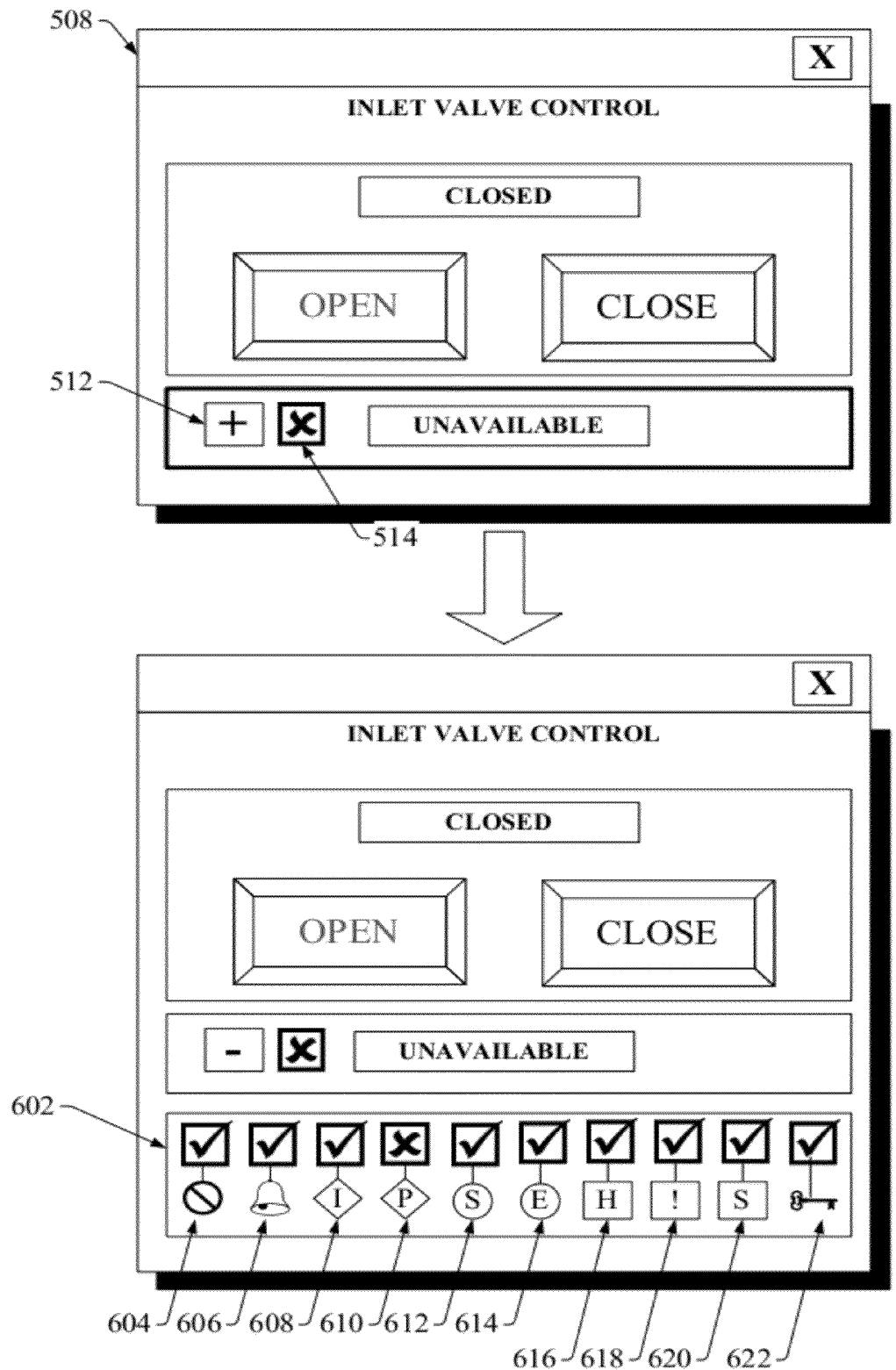
FIG. 6 illustrates expansion of an HMI screen to display categorized condition statuses for an exemplary valve control module.

Status display generator 506, having analyzed valve control module 402 and determined that a necessary condition has not been met, can display an overall status icon 514 on display screen 508 conveying that the "valve open" command is not available (as indicated by the "X"). Status display generator 506 can also provide an expansion button 512 that, when touched or clicked, will provide more detailed diagnostic information relating to the conditions and their present statuses, as illustrated in FIG. 6. This additional diagnostic information can be appended to display screen 508 as diagnostic area 602. In one or more alternative embodiments, the additional diagnostic information can be rendered on a separate "pop-up" screen overlaid over display screen 508.

Diagnostic area 602, generated by status display generator 506, lists the one or more conditions or categories of conditions that affect the availability of the "open valve" operation, and indicates which conditions are preventing the operation. Conditions or categories having a checkmark are in a proper state to allow the desired open command to be issued. Conditions with an "X" are preventing the open command from being issued and must be corrected before the valve can be opened. Conditions listed in this exemplary application include a valve disabled/enabled status 604, an alarm active status 606, interlock status 608, permissive status 610, software stop status 612, emergency stop status 614, hand mode 616, override mode 618, stale data or loss of communications 620, and security privilege status 622. These conditions/categories are only intended to be exemplary, and it is to be appreciated that any suitable conditions can be listed in accordance with the particular control action being diagnosed. Upon examination of diagnostic area 602, it can be seen that at least one permissive is in a state that is preventing the valve open command from being issued, as indicated by the "X" at condition 610.

Figure 7:
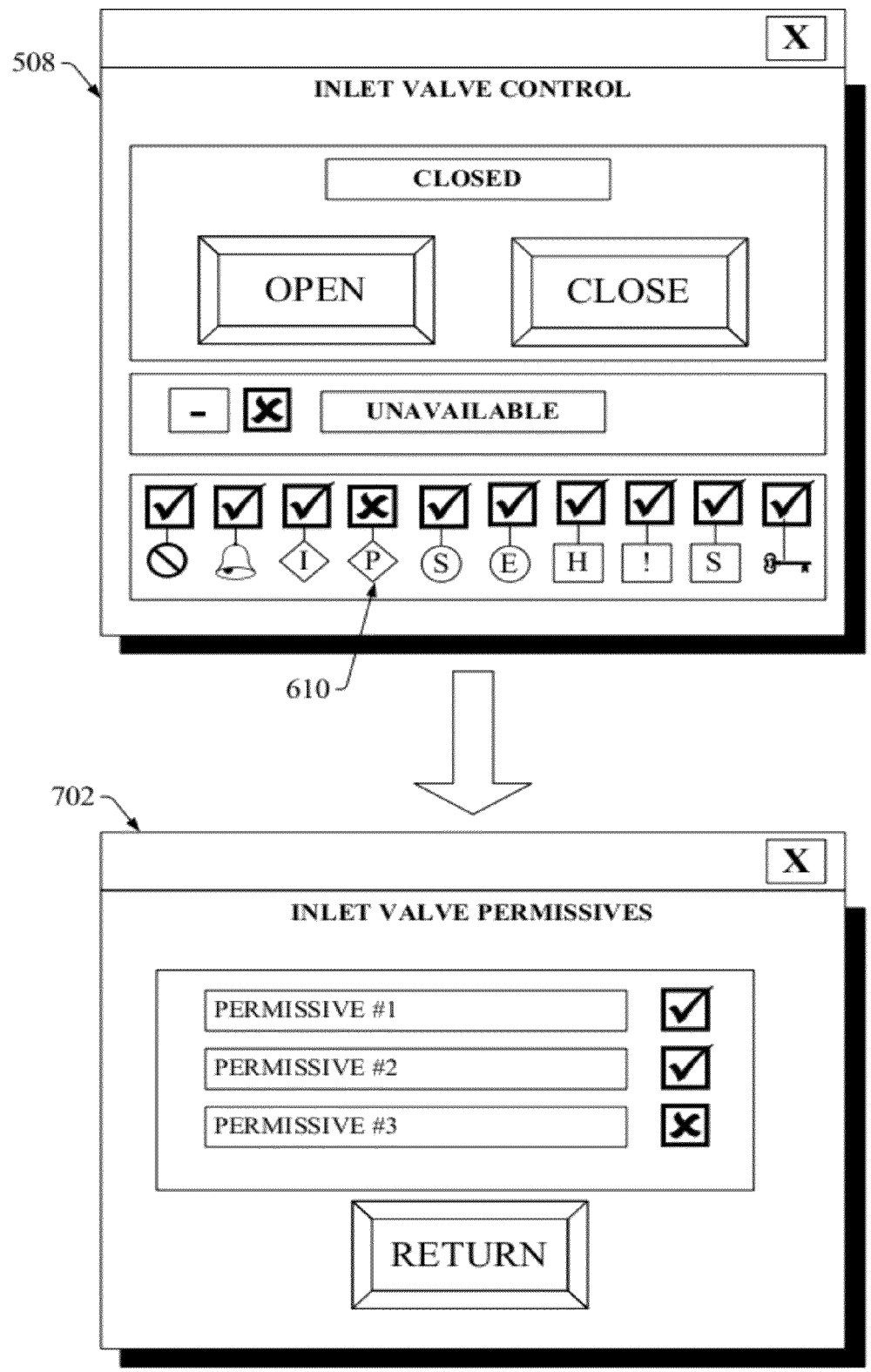
FIG. 7 illustrates a drill-down display that lists individual permissives for an exemplary valve control module.

Since permissive indicator 610 represents a composite status of the multiple permissives 416 depicted in FIG. 4, this category of conditions can be expanded (e.g., by selecting the permissives icon 610) to display the statuses of the individual permissives. An exemplary permissive display 702 is illustrated in FIG. 7 as a "pop-up" display that can be overlaid over display screen 508 when the permissive icon 610 is selected. In the present example, permissive #3 of the permissives 416 is in a state that is preventing the valve from being opened.

It is to be appreciated that the statuses displayed in the diagnostic area 602 are ascertained by the status display generator 506 through analysis of valve control module 402 without the need for an HMI application developer to create individual links to each condition in the controller. That is, by virtue of the configured link between status display generator 506 and valve control module 402, the status display generator is able to read the operating status and mode of the valve control module, identify any alarms associated with the control module, and identify any control module inputs (e.g., permissives, interlocks, etc.) that allow or prevent setting of the "open valve" output 422. If multiplexing modules are used to aggregate multiple interlocks or permissives into a composite status for delivery to the valve control module, as in the programming scenario of FIG. 4, the status display generator 506 can detect that one or more multiplexing modules are linked to the valve control module and trace back through the multiplex modules to identify the individual interlocks/permissives, as well as their respective statuses. Since status display generator is capable of identifying conditions that affect availability of a given control action in this fashion, conditions can be added or removed in the control program without requiring an application developer to update the diagnostic display in the HMI.

Figure 8:
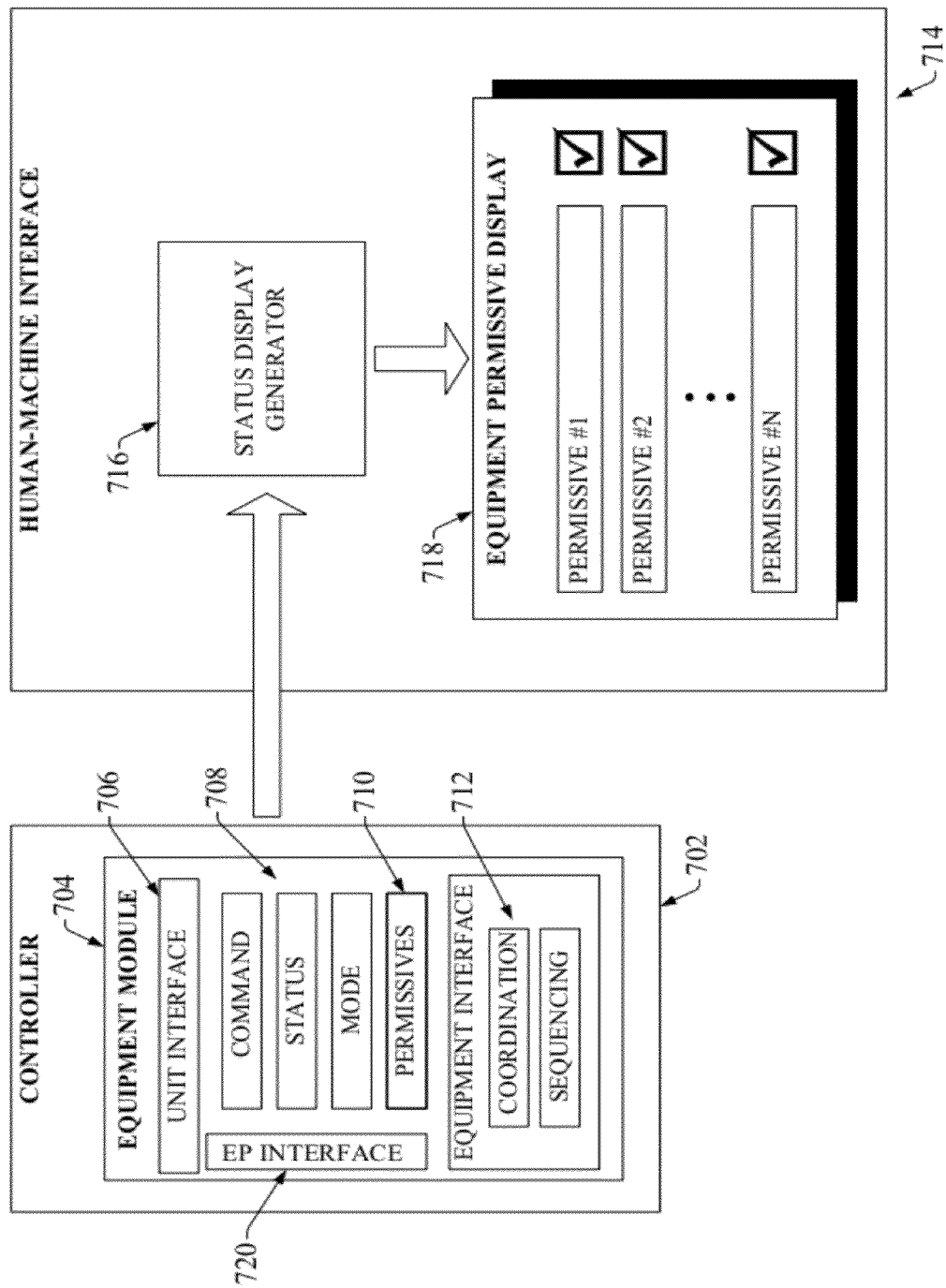
FIG. 8 depicts generation of a permissive display for an exemplary equipment module.

FIG. 8 illustrates another exemplary application of the subject enhanced diagnostic system according to one or more embodiments. In this scenario, status display generator can read the permissive information associated with an equipment module 704 deployed within the controller 702. Such equipment modules are described in U.S. patent application Ser. No. 11/774,824, filed by the applicant on Jul. 9, 2007, and incorporated herein by reference. Equipment module 704 can sequence and coordinate equipment via one or more control modules (not shown). Equipment module 704 can include an equipment interface 712, a unit interface 706, and an equipment phase interface 720 that interacts with a respective equipment phase (not shown). The equipment module 704 can also include components for commands, statuses, and modes (e.g., manual versus automatic, fault, reset) as shown at 708, as well as a component for permissives 710, where the permissives define conditions that allow equipment associated with the equipment module 704 to take actions. Status display generator 716 can be linked to the equipment module 704 through any appropriate addressing or tagging method by an HMI application developer, as discussed supra. Thereafter, the status display generator 716 can read the permissives in the permissives component 710 of the equipment module 704 and employ this data to generate a permissives summary 718 for the equipment module in a manner similar to the embodiments described above. Although the example illustrated in FIG. 8 depicts the permissives being read from an equipment module, it is to be appreciated that any type of software module executing in controller 702 having permissives encoded therein can be analyzed by the status display generator 716, which can leverage the encoded permissives to generate suitable permissive summary displays for the module.

Figure 9:
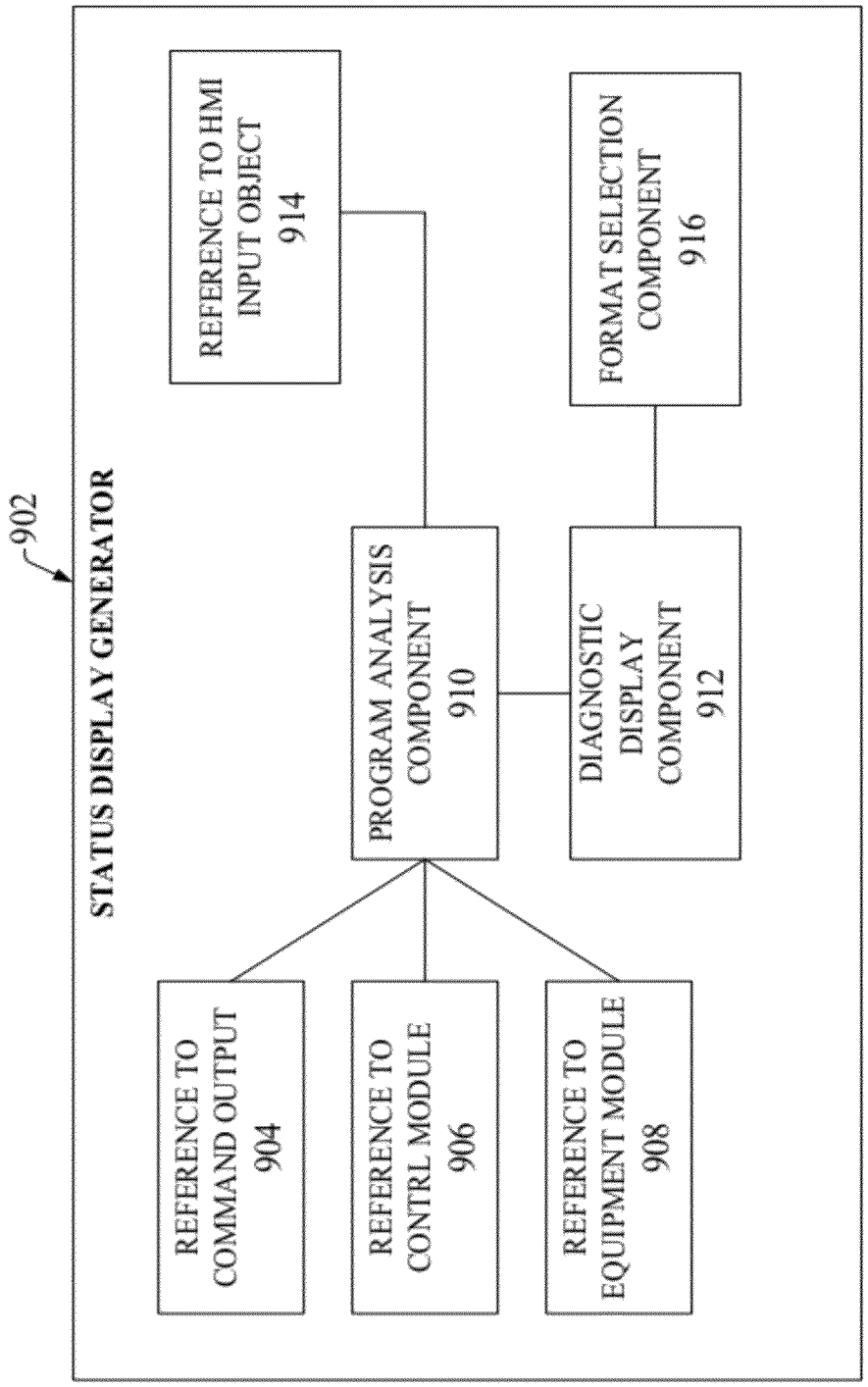
FIG. 9 depicts various functional components and external references that can comprise one or more embodiments of the status display generator.

FIG. 9 depicts various functional components and external references that can comprise one or more embodiments of the status display generator 902. The components illustrated in FIG. 9 are only intended to be exemplary, and it is to be appreciated that the status display generator need not contain all components described herein. As noted above, status display generator can include a reference to the command output 904 with which the generator 902 is associated. The command output can represent an output coil, a tag, an address, etc. in the control program that is activated to initiate the desired command. The reference to the command output can be configured in the generator 902 by an HMI application developer, for example, using any suitable addressing or tagging scheme.

Additionally or alternatively, status display generator 902 can be configured to include a reference to a control module 906 or an equipment module 908, which can execute in a controller to carry out a portion of a control process or to control a particular device. The control module or equipment module can have associated therewith or encoded therein one or more conditions that must be met before a control action associated with the modules can be executed. As with references 904, the reference to the control module 906 and/or equipment module 908 can be configured in the generator 902 by an HMI application developer through any suitable linking mechanism (e.g., addressing, tag reference, etc.).

Status display generator 902 can also include a program analysis component 910 that works in conjunction with one or more of the references 904, 906, or 908. Program analysis component 910 can perform an analysis of the control program executing in the controller, and in particular the portion of the control program relating to one or more of the program elements referenced at 904, 906, or 908. For example, if status display generator 902 is configured to reference a desired command output at 904, the program analysis component 910 can poll the controller and analyze the control program to identify any conditions placed on activation of the referenced command output Likewise, if a control module is referenced at 906, program analysis component can poll the controller and examine the referenced module to determine any control conditions (e.g. interlocks, permissives, alarms, module modes, etc.) associated with the control module, including any such conditions that are linked to the control module via one or more multiplexing modules. Once the relevant conditions have been identified, the program analysis component 910 can read both the identity and statuses of the respective conditions into the status display generator 902. Reading the identities of the conditions can include, for example, reading any embedded comments or labels associated with the addresses for the respective conditions. These comments or labels can subsequently be used by the status display generator 902 to populate the diagnostic displays.

Once the program analysis component 910 has identified the relevant conditions and their respective statuses, this information can be passed to a diagnostic display component 912, which can use this information to dynamically display diagnostic summaries as discussed above. The diagnostic summaries can be created dynamically by the diagnostic display component 912 without the need for an end-user HMI application developer to create a new display screen as part of the application. The format of the diagnostic summaries can be selected by a format selection component 916 to conform to one of multiple predefined summary formats. For example, the status display generator 902 can have the capability to generate a summary as a status checkbox list, a color-coded permissive flowchart, or other such formats that are predefined for the generator 902. An HMI application developer can configure a setting for the format selection component 916 that determines which of the predefined formats will be used to generate the summary. Alternatively, a format selection setting can be passed to the format selection component 916 by the HMI application at run-time to facilitate dynamic selection of an appropriate format based on criteria specified by the application developer. The format selection component 916 can also define the display window type to be used when generating the summary. For example, the diagnostic summary can be rendered as a "pop-up" window overlaid on the current primary display. Alternatively, the summary can be inserted into the current display screen in an expanded portion of the current display, or can replace the current display as the new primary display. Selection of a desired display window type can be set in the format selection component 916, which instructs the display generation component 912 how to render the summary.

Status display generator 902 can also include a reference to an HMI input object 914 that links the generator to an HMI display object (e.g., a pushbutton, a data entry field, a virtual switch, etc.) used to issue the command for the action associated with the command output, control module, or equipment module referenced at 904, 906, or 908. By establishing this link between this HMI object, program analysis component 910 can enable or disable the HMI object based on the analysis of whether the conditions will allow the action. Thus, the status display generator 902 can, for example, disable an HMI pushbutton (such as button 510 of FIG. 5) and visually modify the button to indicate that the action is currently disabled (e.g., "grey out" the button or render the button invisible). When all conditions associated with the action have been placed in a correct state, the program analysis component 910 can re-enable the button and allow the user to issue the command.

Figure 10:
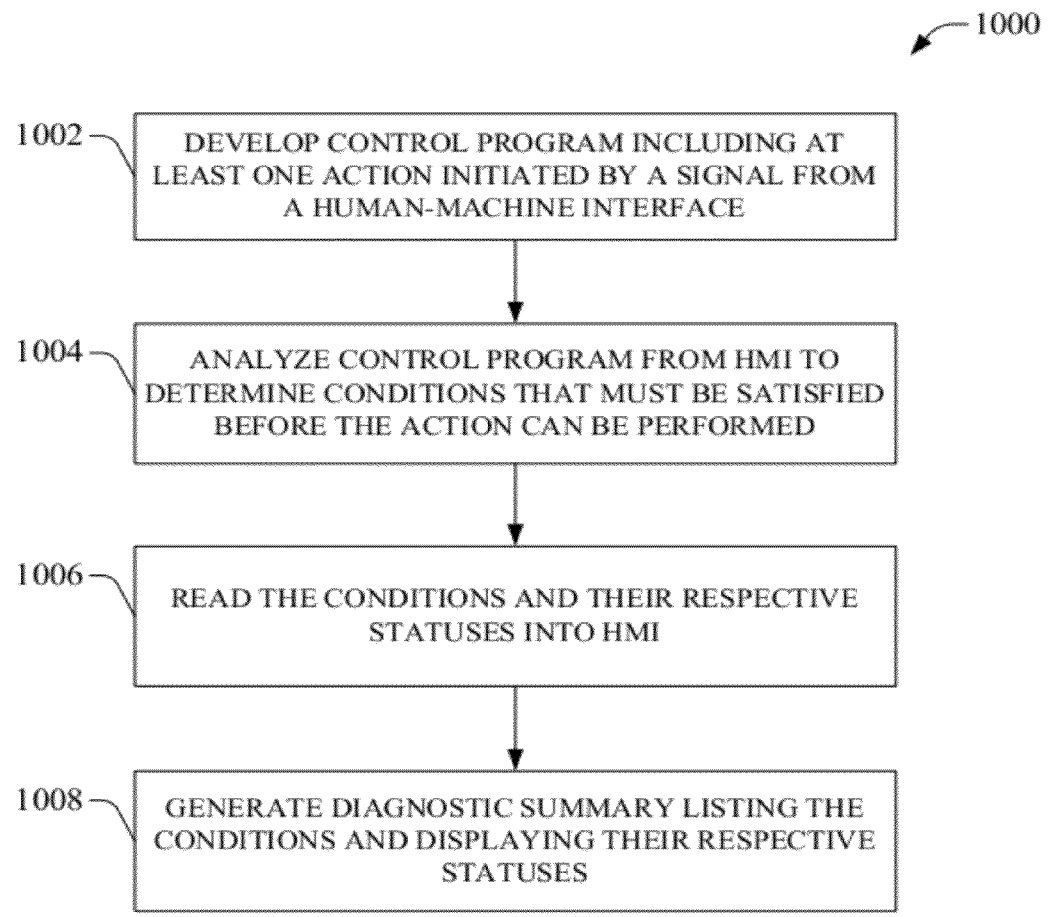
FIG. 10 is a flowchart of an example methodology for dynamically generating a diagnostic summary for a control action in an automation controller.
Figure 11:
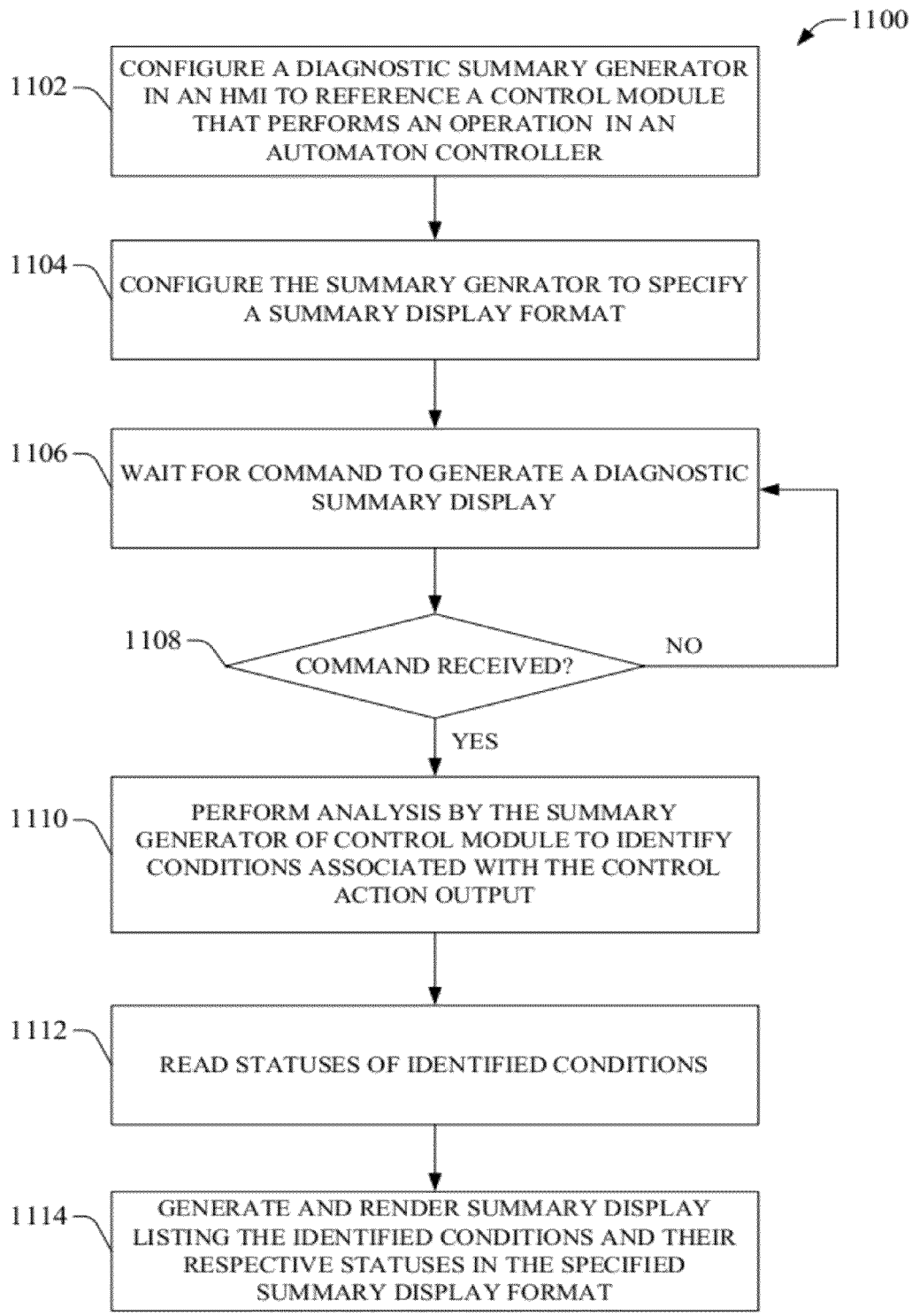
FIG. 11 is a flowchart of an example methodology for configuring and employing a diagnostic summary generator to dynamically create and render control action condition summaries.
Figure 12:
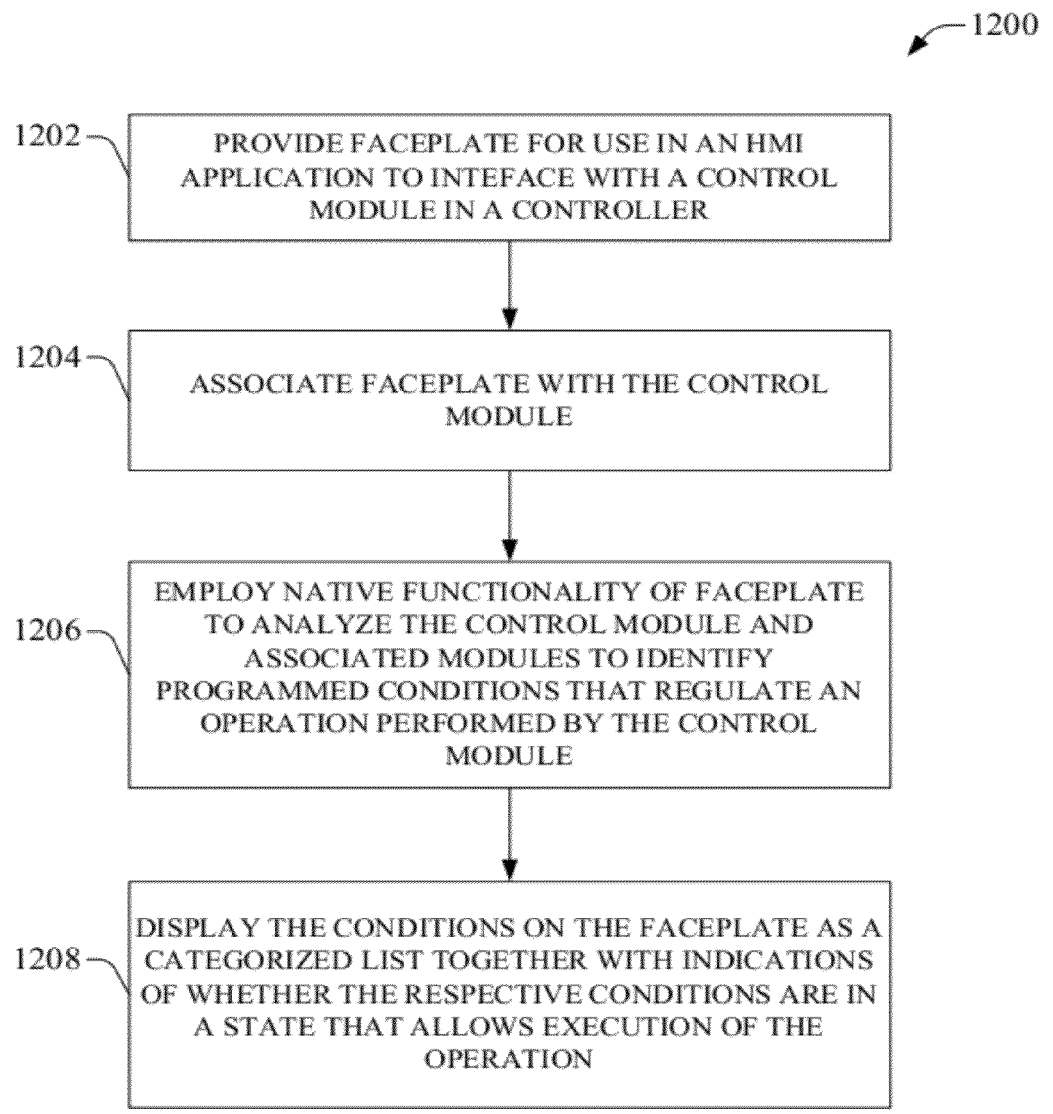
FIG. 12 is a flowchart of an example methodology for utilizing an HMI faceplate to display diagnostic information associated with a control module

FIGS. 10-12 illustrate various methodologies in accordance with the claimed subject matter. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 10 illustrates an example methodology 1000 for dynamically generating a diagnostic summary for a control action in an automation controller. At 1002, a control program is developed for an automation controller that includes at least one control action that can be initiated by a signal from an HMI. The control action can include such functions as starting a machine cycle, actuating a movable field device, initiating a home sequence for a machine or process, changing a setpoint value, or other such actions. At 1004, the control program is analyzed from the HMI to determine any programmed conditions associated with the control action that must be satisfied before the action can be performed in response to the HMI signal. If the control program comprises a ladder logic application, this analysis can comprise locating the rung output associated with the desired action and determining any rung conditions, apart from the HMI signal itself, that must be satisfied in order to set the rung output. If the desired action is performed by a control or equipment module executing in the controller, the analysis can comprise reading any conditions encoded in the module or linked to the module from other portions of the control program. This analysis can also include identifying any separate multiplexing modules that aggregate multiple conditions and provide a composite status signal to the module, and identifying the conditions being aggregated by these multiplexing modules. Exemplary conditions can include sensor inputs indicating that potentially interfering machine components are in a retracted or non-interfering position, an indication that all safety devices are in place, a confirmation that a mode switch is in a correct position for the desired action, a confirmation that air or oil pressure is within an operational tolerance, confirmation that all alarms relating to the action are cleared, or other such criteria.

At 1006, the identified conditions are read from the controller into the HMI together with their current statuses. This can include reading any comments or text labels associated with the respective conditions' program addresses, which can subsequently be used to identify the necessary conditions to an operator. Using the information read at step 1006, a diagnostic summary is generated at 1008 listing the identified conditions (e.g., displaying the comments or text labels) together with the respective statuses of the conditions. The status of each condition can be displayed in a manner that expressly conveys whether the permissive is in a proper state for execution of the desired control action (e.g., "Ready" or "Not Ready"). Moreover, the summary can be generated and populated using native functionality within the visualization software and without the need for an end-user developer to design a new screen to display the permissive summary data.

FIG. 11 illustrates an example methodology 1100 for configuring and employing a diagnostic summary generator to dynamically create and render control action condition summaries. At 1102, a diagnostic summary generator is configured in an HMI such that the generator references a control module that performs a desired control operation in an automation controller. This referencing can be achieved using any suitable addressing scheme that links the diagnostic summary generator to the desired control module. At 1104, the summary generator is further configured to specify a desired summary display format. In one or more embodiments, the summary generator can include the capability to generate diagnostic displays in a variety of display formats, such as a checkbox list format, a color-coded logic flow format, or other such formats. The summary generator can be configured, either by a developer or dynamically by an HMI application, to select a desired format from the multiple predefined formats. In addition, a display window type can be specified in the summary generator that dictates whether the diagnostic display will be rendered as an overlaid "pop-up" window over a primary display screen, whether the diagnostic display will replace the current display screen as the primary display, whether the diagnostic information will be inserted in an expanded portion of the current display, etc.

At 1106, the method waits for a command to generate a diagnostic summary display. This command can be triggered via operator interaction with an appropriate display object on a HMI screen, such as an icon located near a display object designed to trigger the desired control operation. At 1108, it is determined whether the command to generate the diagnostic display is received. If the command is not received, the method returns to step 1106 to continue waiting for the command. Alternatively, if the command is received at step 1108, the summary generator performs an analysis of the control module and any associated modules (e.g., multiplex modules) at 1110 to identify the conditions that must be satisfied before the control operation can be performed.

At 1112, the current statuses of the identified conditions are read by the summary generator. At 1114, a diagnostic display is generated by the summary generator and rendered on the HMI for presentation to an operator. The diagnostic display can list the conditions identified at step 1110 together with their respective statuses read at step 1112. The diagnostic display can be rendered in a format commensurate with the desired display format specified at step 1114. In one or more embodiments, the summary generator can organize the conditions on the diagnostic display according to category, and can present the conditions at multiple levels of granularity such that the multiple levels can be navigated by the operator. The rendered diagnostic display clearly conveys to an operator which conditions are not satisfied and are therefore preventing the desired control operation from being initiated from the HMI, allowing the operator to quickly assess what actions must be taken to place the system in the appropriate state to execute the desired control operation.

FIG. 12 illustrates an example methodology 1200 for utilizing an HMI faceplate to display diagnostic information associated with a control module. At 1202, a faceplate is provided that is designed to act as an interface with a control module executing in a controller. The faceplate can be, for example, an HMI display or object configured with one or more controls and/or display fields customized for interaction with a particular type of control module (e.g., a valve control module faceplate, a motor control module faceplate, etc.). The faceplate can include objects (e.g., pushbuttons, data fields, etc.) that allow commands to be issued to the control module that facilitate execution of an operation performed by the module. At 1204, the faceplate is associated with a particular control module of the appropriate type deployed within an industrial controller. For instance, if a developer of an HMI application wishes to include a means for an operator to issue control signals to a valve control module that executes in a controller, a valve control faceplate can be selected in the HMI development environment and uniquely associated with the particular valve control module within the control program to be interfaced. Association between the faceplate and the control module can be achieved using any suitable addressing or tagging mechanism.

At 1206, the faceplate can employ native functionality to analyze the control module during runtime and identify any programmed conditions that regulate an operation performed by the module. This can include identifying any permissives, interlocks, alarms, etc. encoded within the module, as well as any conditions that have been aggregated by separate multiplex modules and provided to the control module as an aggregated status value. In addition to identifying the relevant conditions, the statuses of these respective conditions can also be read by the faceplate. At 1208, the identified conditions are displayed on the faceplate as a categorized list together with indications of whether the respective conditions are in a state that allows execution of the operation by the control module.

Embodiments, systems and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet and ControlNet. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

Figure 13:
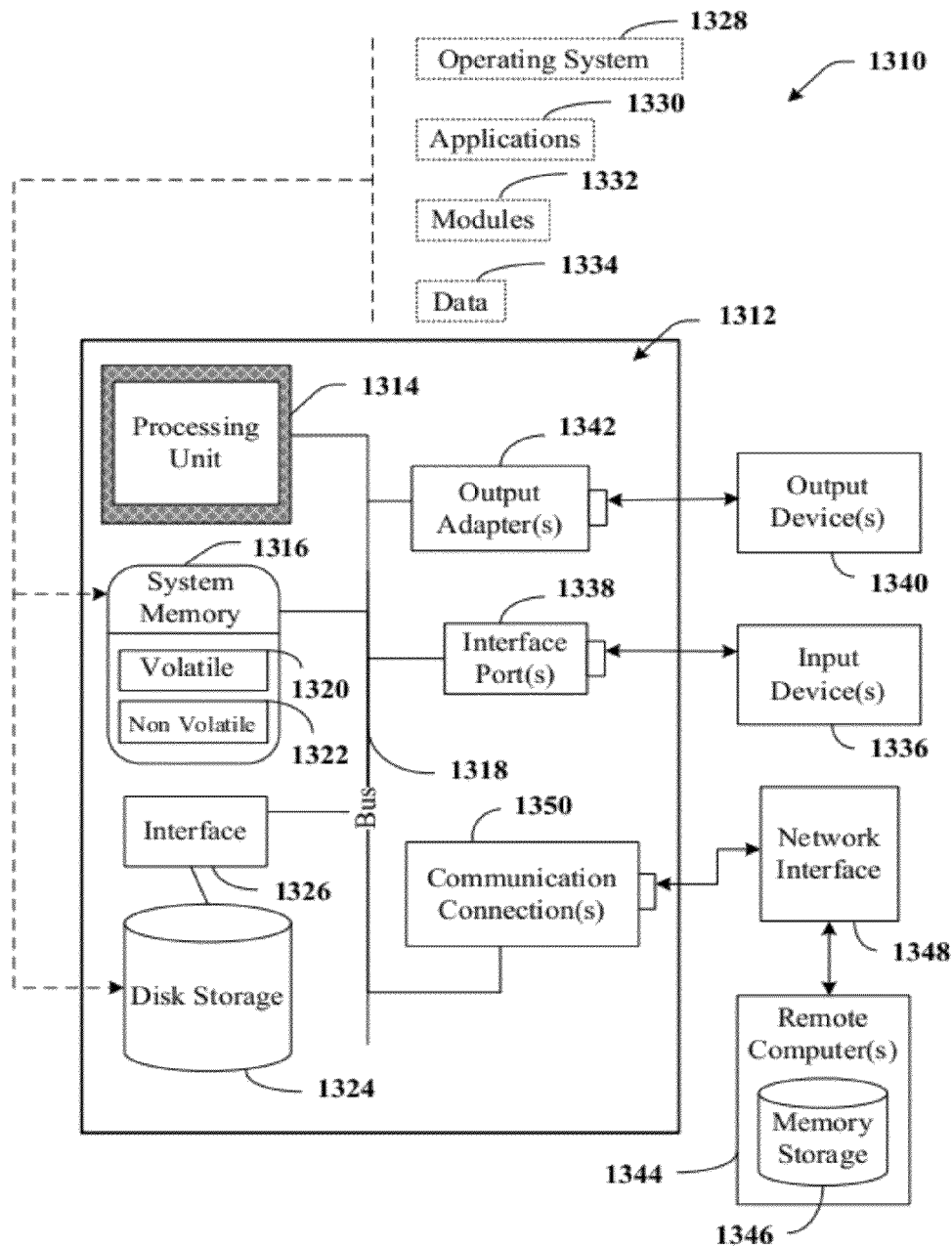
FIG. 13 is an example computing environment.

With reference to FIG. 13, an example environment 1310 for implementing various aspects of the aforementioned subject matter, including retaining documentation natively within memory of an industrial controller, includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable PROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
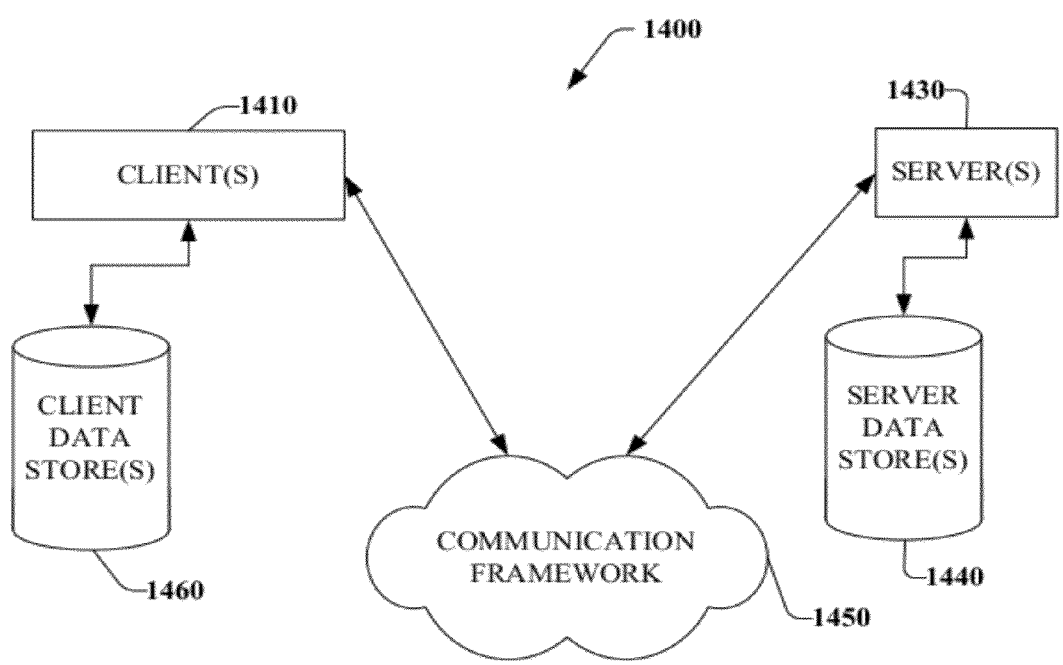
FIG. 14 is an example networking environment.

FIG. 14 is a schematic block diagram of a sample-computing environment 1400 with which the disclosed subject matter can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the subject invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A system for visualizing permissive diagnostic information, comprising:
a processor; and
a memory communicatively coupled to the processor, having stored thereon computer-executable components configured to implement the system, including:
a program analysis component configured to determine, based on an analysis of a control program, one or more programmed conditions defined within the control program that are to be satisfied to allow activation of a control output; and
a diagnostic display component configured to generate a summary display that indicates the one or more programmed conditions and status information respectively associated with the one or more programmed conditions, wherein the summary display includes an icon associated with a programmed condition of the one or more programmed conditions, and wherein selection of the icon causes the diagnostic display component to render a permissive display for the programmed condition that displays respective one or more permissive statuses associated with the programmed condition.

2. The system of claim 1, wherein the program analysis component is further configured to reference at least one of a controller output, an output coil, a tag, or an address associated with the control output and determine the one or more programmed conditions based on an analysis of a portion of the control program that controls a state of the at least one of the controller output, the output coil, the tag, or the address.

3. The system of claim 1, wherein the program analysis component is further configured to reference an equipment module deployed in the control program that controls the control output and read the one or more programmed conditions from the equipment module.

4. The system of claim 1, wherein the program analysis component is further configured to reference a control module deployed within the control program and read the one or more programmed conditions from the control module.

5. The system of claim 4, wherein at least a subset of the one or more programmed conditions comprise multiple conditions that are aggregated by a multiplex module associated with the control module, and wherein the program analysis component is further configured to identify the multiple conditions aggregated by the multiplex module.

6. The system of claim 1, wherein the diagnostic display component is further configured to render on the summary display an indication conveying whether at least one of the one or more programmed conditions is in a state for the activation of the control output.

7. The system of claim 1, wherein the program analysis component is further configured to read from the control program at least one of a comment string or a label string associated with at least one of the one or more programmed conditions, and wherein the diagnostic display component is further configured to render the at least one of the comment string or the label string on the summary display to identify the at least one of the one or more programmed conditions.

8. The system of claim 1, wherein the program analysis component and the diagnostic display component are configured to execute in a human-machine interface (HMI) communicatively coupled to an automation controller that executes the control program.

9. The system of claim 1, wherein the diagnostic display component is further configured to render the summary display in response to selection of an icon associated with a composite availability indicator rendered on an interface display screen, wherein a state of the composite availability indicator is a function of an availability status of the control output.

10. A method for displaying permissive status information, comprising:
analyzing a portion of a control program, executing in an industrial controller, that controls execution of a control function;
identifying, based on the analyzing, one or more programmed conditions defined within the portion of the control program that prevent execution of the control function in response to at least one of the one or more programmed conditions being determined not to be satisfied; and generating a diagnostic summary display that displays the one or more programmed conditions and state information for the one or more programmed conditions, wherein the diagnostic summary display includes an icon associated with a programmed condition of the one or more programmed conditions, and wherein selection of the icon renders a permissive display for the programmed condition that displays respective one or more permissive statuses associated with the programmed condition.

11. The method of claim 10, wherein the analyzing comprises analyzing the portion of the control program that controls a state of at least one of a controller output, an output coil, a tag, or an address that initiates the control function.

12. The method of claim 10, wherein the analyzing comprises analyzing an equipment module deployed in the industrial controller that initiates the control function.

13. The method of claim 10, wherein the analyzing comprises analyzing a control module deployed in the industrial controller, and wherein the control module encodes the one or more programmed conditions.

14. The method of claim 13, wherein the analyzing the control module further comprises determining whether a multiplex module provides an aggregated condition status to the control module and identifying a subset of the one or more programmed conditions being aggregated by the multiplex module.

15. The method of claim 10, further comprising selecting a display format for the diagnostic summary display from a plurality of predefined display formats.

16. The method of claim 10, further comprising rendering on the diagnostic summary display an indication specifying whether at least one of the one or more programmed conditions is in a state allowing the execution of the control function.

17. The method of claim 10, further comprising:
reading at least one of a comment string or a label string associated with a program address for at least one of the one or more programmed conditions; and
displaying the at least one of the comment string or the label string on the diagnostic summary display.

18. A non-transitory computer-readable medium having stored thereon computer-executable instructions that, in response to execution, cause a computer to perform operations, the operations comprising:
determining, based on polling a control program, one or more programmed conditions defined within the control program that are to be satisfied in order to allow execution of a control command by the control program; and
generating a condition summary that displays the one or more programmed conditions and at least one state associated with at least one of the one or more programmed conditions, wherein the condition summary includes an icon associated with a programmed condition of the one or more programmed conditions, and wherein selection of the icon renders a permissive display for the programmed condition that displays respective one or more permissive statuses associated with the programmed condition.

19. The non-transitory computer-readable medium of claim 18, the operations further comprising displaying an indication of whether the at least one state allows the execution of the control command by the control program.

* * * * *